Figures 1, 2:
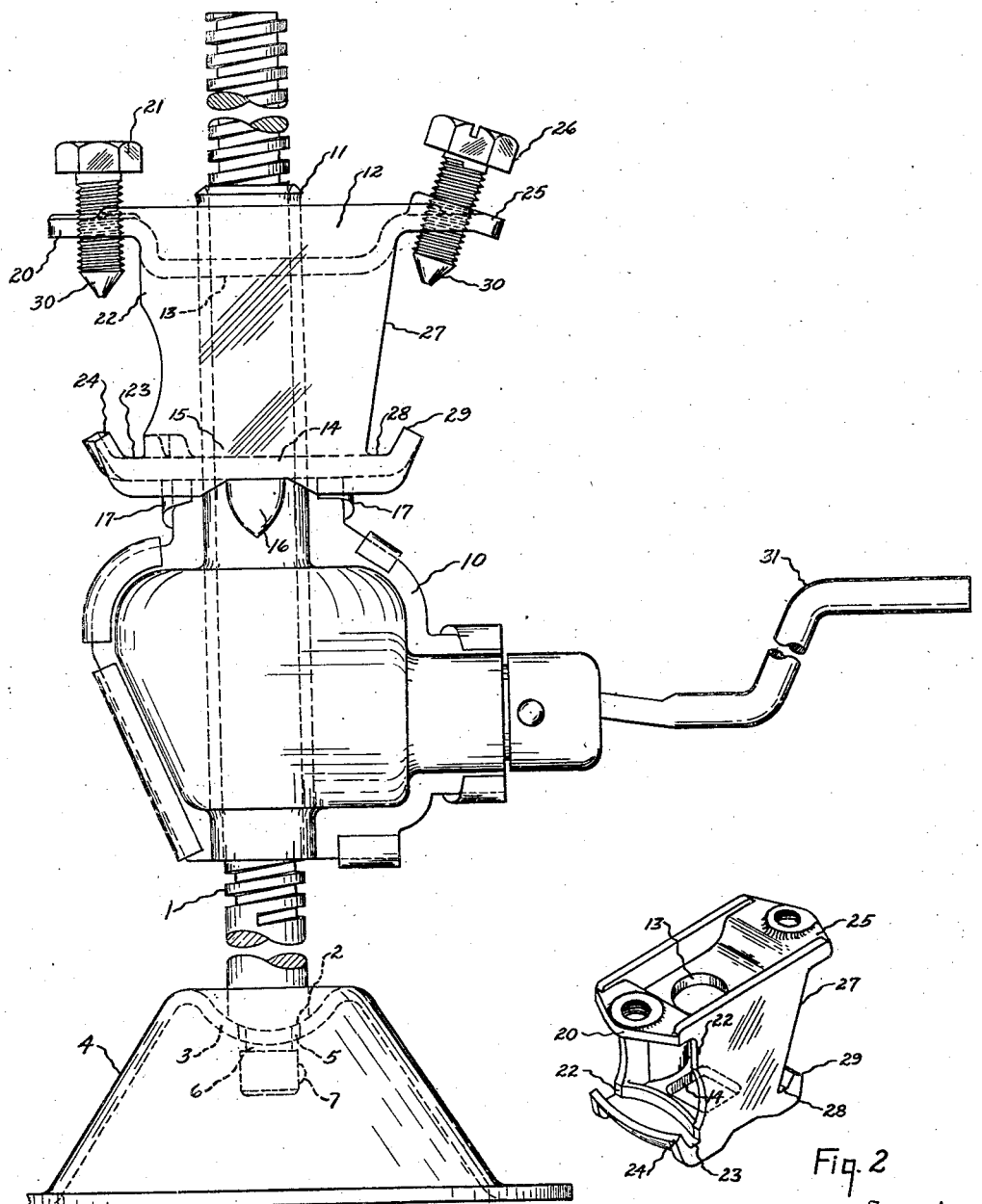

Inventor
Frederick E. Beach

Sept. 15, 1936. F. E. BEACH 2,054,568
VEHICLE JACKING STRUCTURE
Filed June 10, 1935 2 Sheets-Sheet 2
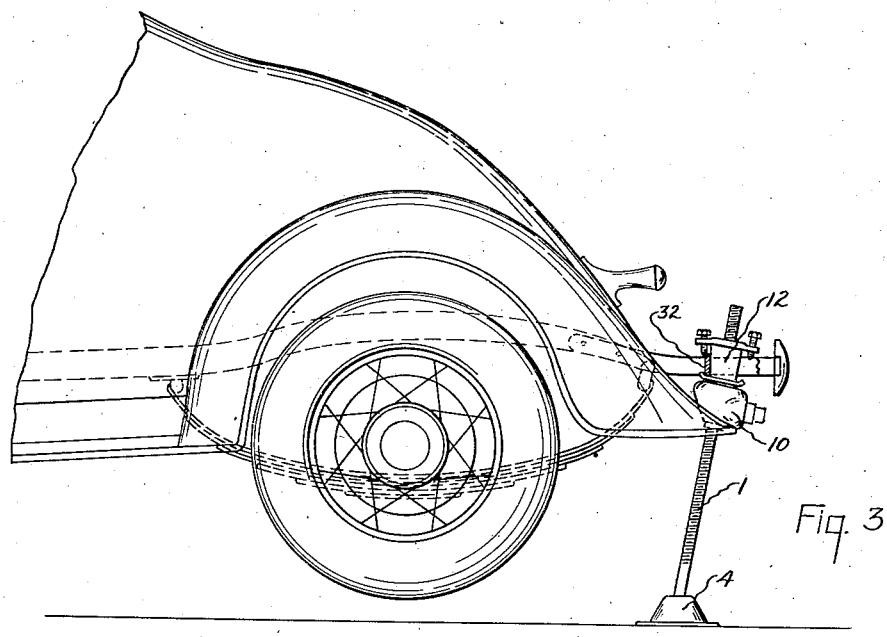
Fig. 3
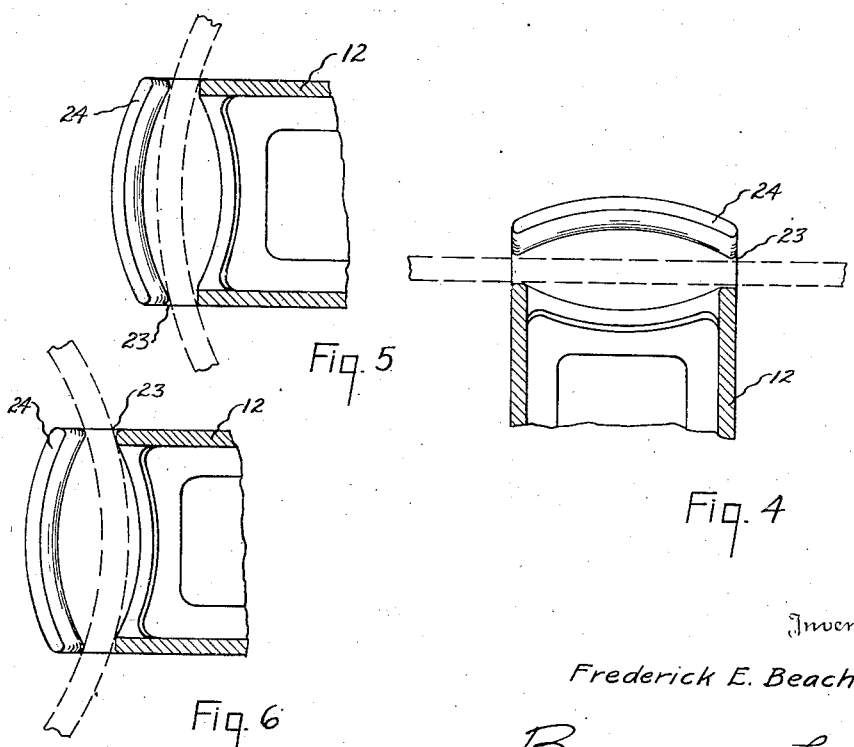
Fig. 5
Fig. 4
Fig. 6
Inventor
Frederick E. Beach
By Beaman & Langford
Attorney Patented Sept. 15, 1936

2,054,568

UNITED STATES PATENT OFFICE 2,054,568

VEHICLE JACKING STRUCTURE

Frederick E. Beach, Detroit, Mich., assignor to Ryerson & Haynes, Inc., Jackson, Mich., a corporation of Michigan Application June 10, 1935, Serial No. 25,837

18 Claims. (Cl. 254—133)

The present invention relates to improvements in jacking structure, and has particular reference to jacking structures for automotive vehicles.

The invention is an improvement over the construction disclosed in the application Serial No. 3,483 of Stephen DeOrlow, filed January 25, 1935, and the patent of Stephen DeOrlow No. 1,994,984, and resides particularly in the bracket for supporting a sprung part of the vehicle.

The jack disclosed in the above application is arranged for bearing against the bumper structure or against a special bracket secured on or near the bumper so that the jack does not have to be placed beneath the car, where it is difficult to manipulate. While the above earlier jack was designed to reduce the tendency of a jacked vehicle to roll off the jack, I have found that with a different design embodying the earlier design, the tendency of the vehicle to roll off the jack can be still further reduced.

When jacking the sprung portion of a vehicle, the wheels and associated mechanism have to be lifted by the main springs of the vehicle which are of course primarily designed to act in compression rather than tension. In jacking the rear of an automotive vehicle, the heavy differential and casing must be supported by the rear main springs. The result is that the sag in the main springs, or one of them if one side only of the vehicle is lifted, is so great that the body must be raised a considerable distance before the wheels leave the ground. By the time the wheels leave the ground, the portion of the vehicle to which the jack is secured is no longer over the base of the jack, but somewhat to one side of it. The body of the jack is then at an angle to the horizontal and there is a considerable force tending to roll the vehicle forward, and the vehicle will move forward unless the brakes are set tightly, which is not always the case. Furthermore, the mere lifting of one end of a vehicle tends to make it roll away from the jack lifting it. I have found that by constructing the bracket by which the jack is secured to the vehicle with an angular attachment portion so that the jack may be disposed at a compensating angle to the ground, the above noted difficulties are eliminated.

In most automotive vehicles the weight, including the wheels, which must be lifted by the front main springs, is not as great as the corresponding weight in the rear. Consequently, the distance the sprung part of the vehicle must be lifted before the front wheels leave the ground is not nearly so great as for the rear wheels. Furthermore, in front wheel mountings of the "knee action" and transverse spring type, there is usually a stop for each wheel which limits the opening of the main springs. Thus in jacking up the front portion of an automotive vehicle, the angular securing bracket is not always necessary. For this reason and for the reason that the vehicle being jacked might be on inclined ground, my improved securing bracket has two securing portions, one straight and the other angularly disposed.

In providing a bracket for securing the jack to a vehicle, the problem of having to secure the bracket to a curved bumper bar is often met. According to the present invention the bracket receiving the bumper bar has a seat of such configuration that it may be secured to any bumper bar no matter what its configuration may be, and conseqently a jack of one design may be manufactured for any type of vehicle, such a jack being desirable for the service replacement trade.

Accordingly, an object of this invention is to provide a securing bracket for a jack, being angularly disposed with respect to the jack body.

Another object is to provide a securing bracket for a jack, having one securing portion angularly disposed to the jack body and another securing portion parallel to the jack body.

A further object of the invention is to provide a jack for lifting the sprung portion of a vehicle, having an attachment structure arranged so that the jack may be secured to the vehicle while it is disposed at an angle to the ground.

A still further object is to provide a securing bracket for a jack having a curved receiving portion for receiving a curved bar or the like.

These and other objects will be apparent from the following specification when taken with the accompanying drawings, in which Fig. 1 is an elevation of the jack structure, Fig. 2 is a perspective view of the attachment structure, Fig. 3 is an elevation of the jack clamped to and supporting in raised position the rear of an automobile, and Figs. 4, 5, and 6 are partial horizontal sections of the attachment structure showing in dotted lines bumper brackets having various configurations, in clamped position.

Generally, the present invention comprises a jack structure consisting of a threaded thrust bar extending through a housing within which there is located a suitable nut and gear mechanism for downwardly directing the thrust bar for elevation of a part of a vehicle to which an attachment structure associated with the housing is clamped. As shown, the attachment structure takes the form of a vertical shoulder and an angularly disposed shoulder, each having a seat portion for confining the lower edge of the part of the vehicle to which the jack is clamped, and a manually adjustable screw having a conical nose for clamping the part of the vehicle against the vertical or the angularly disposed shoulder. When the angularly disposed shoulder is clamped to a portion of the vehicle, such as the bumper bracket, which is usually vertically disposed, or a special bracket, the jack takes an angular position with respect to the horizontal. Thus, the tendency of the vehicle to roll forward when it is raised is resisted to a considerably greater extent than when the jack is in a vertical position.

Referring particularly to the drawings, the jack comprises a threaded thrust bar 1 of sufficient length to enable the jack when clamped to a sprung portion of the vehicle, as a bumper bracket, to elevate the sprung portion to a sufficient height to raise a running wheel from the ground. The lower end of the thrust bar 1 is provided with a convex base 2 resting in a concave seat 3 in a base 4. The seat 3 is provided with a central aperture 5 and receives the centering pin 6 turned down on the lower end of the thrust bar 1. The centering pin 6 is provided with a yieldable detent 7 for yieldingly maintaining the base 4 connected to the thrust bar 1, but permitting detachment of the base 4 to enable the jack to be readily stored in a compact compartment of a vehicle. The central aperture 5 is of somewhat greater diameter than the pin 6 in order to permit a ball and socket action between the thrust bar 1 and the base 4. The ball and socket action is desirable not only to enable the base 4 to rest flatly on the ground when the thrust bar 1 is angularly disposed, but also to adapt the base 4 to uneven places on the ground.

A housing 10, through which the thrust bar 1 extends, is preferably of sheet metal and may be of a construction similar to that shown in the aforesaid application and patent. The upper part 11 of the housing 10 is preferably cylindrical in form, and constitutes a sleeve about the thrust bar 10, and a post for mounting the attachment structure 12 which has an upper perforation 13 and a lower squared perforation 14 for receiving the upper part 11. Also, as in the aforesaid application and patent, the upper part 11 is provided with a squared portion 15 about which the squared aperture 14 fits. The attachment structure 12 is vertically slidable on the upper part 11 and may be angularly adjusted relative to the upper part 11 and to the housing 10 by raising it out of interlocking engagement with the squared portion 15 and rotating it to adjusted position. The embossed portions 16 and the ears 17 on the housing 10 act as supporting seats for the attachment structure 12 and limit its downward movement.

In the form illustrated, the attachment structure 12 is a malleable iron casting. However, it may be fabricated from a sheet metal stamping, or be otherwise constructed without departing from the spirit and scope of the invention. The attachment structure according to the present invention is provided with two clamping portions, one being substantially parallel to the thrust bar 1, and the other being angularly related thereto. The substantially parallel clamping portion comprises a horizontally disposed upper portion 20 threadably receiving therein a relatively heavy conical nose screw 21, vertical seating edges 22 substantially parallel to the thrust bar 1, and a lower weight supporting seat 23 having an upturned edge 24. The angularly disposed clamping portion comprises an upper angularly disposed support 25 threadably receiving therein a relatively heavy nose screw 26, seating edges 27 disposed at an angle to the thrust bar 1, and a lower weight supporting seat 28 having an upturned edge 29. The nose screws 21 and 26 each have substantially conical noses 30. It will thus be obvious from inspection of the drawings that the respective nose screws, seating edges, lower weight supporting seats, and upturned lower seat edges define a space for receiving a rectangular bar, for instance, such as a bumper bracket or a specially designed bracket. As shown in the drawings, the lower seat 23 is roughly elliptical in shape. It is provided with such a shape in order that it may accommodate a bumper bar which is straight, as shown in Fig. 4, which is curved in one direction, as shown in Fig. 5, or which is curved in the opposite direction, as shown in Fig. 6. The upper part of a bar of curved configuration is engaged by the conical nose 30 regardless of its direction of curve. When the bar is curved as in Fig. 5 it is engaged by the tip of the nose, and when the bar is curved as in Fig. 6 it is engaged by the base of the nose. The jack is thus adaptable to be used on various makes of cars. Each of the seats 23 and 28 may be shaped to accomodate curved bumper bars, or may be straight as desired. Such a construction thus eliminates the necessity of dealers stocking a separate jack for each type of car having a different bumper bracket construction, making possible a reduction in both dealers' and manufacturers' costs.

The housing 10 houses suitable mechanism for raising the housing 10 together with the attachment portion 12 by rotation of the crank 31. The mechanism within the housing 10 preferably is of the type disclosed in the aforesaid application and patent, but may be of any suitable nature.

The operation of the jack according to this invention is as follows: The crank 31 is turned until the adjustment structure 12 is so positioned on the thrust bar 1 with respect to the base 4 that the distance from the base 4 to the attachment structure 12 is less than the distance from the bumper bar 32, shown in Fig. 3, to the ground. Assuming that the rear of an automobile is to be raised, as shown in Fig. 3, the angularly disposed clamping portion of the attachment structure 12 is used. The bumper bar 32 is disposed in the lower seat 28, and the seating edges 27 are disposed against the vertical side of the bumper bar 32. The nose screw 26 is then turned downwardly until its substantially conical nose engages with the bumper bar 32 to rigidly clamp the bumper bar 32 and the attachment portion 12 together. Due to the angularity of the clamping portion used, the thrust bar 1 will be disposed at an angle to the bumper bar 32 and also to the ground, the angle being of such a nature that the base 4 is nearer the front of the automobile than the attachment portion 12. The angularity of the thrust bar 1 to the ground sufficiently opposes the tendency of the automobile to roll to prevent any lateral bodily movement of the automobile with respect to the ground.

In deciding whether in using the jack according to this invention the angularly disposed clamping portion or the straight portion should be used, if the ground on which the vehicle is resting is level, then, for reasons hereinabove set forth, the angularly disposed clamping portion should be used for the rear, and the straight clamping portion should be used on the front. However, if the ground on which the vehicle is resting slopes, the straight clamping portion may be used on the rear, or the angularly disposed clamping portion may be used on the front, depending on the direction and degree of the slope.

For details of construction not a part of this invention, and for discussions of the features and advantages of such details, reference may be had to aforesaid application and patent.

It will be apparent from the foregoing description that in order to have the thrust bar at a compensating angle to the ground instead of having the receiving and clamping portion at an angle to the thrust bar, an angularly disposed supporting bracket may be secured to the vehicle for reception by a portion of the jack which is parallel to, perpendicular to, or otherwise positioned with respect to the thrust bar. Furthermore, when the thrust bar is at a compensating angle to the ground, the clamping particularly stressed in the aforesaid application may be dispensed with. Thus the attachment portion of the jack may take the form of a socket, and the jack supporting bracket secured to the vehicle may be designed to be received by a socket.

Having thus described my invention, what I desire to secure by Letters Patent and claim is:

1. A lifting jack adapted to be applied to a relatively flat, substantially vertically disposed bar-like member secured to a vehicle to raise the same, the vehicle having a tendency to roll away from the jack when it is lifted thereby, comprising a thrust bar, a housing through which said bar is actuated, an attachment structure carried by said housing having a horizontally disposed ledge spaced from the axis of said thrust bar, upon which the lower edge of said member is adapted to be received and confined against lateral movement, and means above said ledge spaced a greater distance from the axis of said thrust bar than said ledge for engagement with the upper portion of said member for maintaining the same on said ledge.

2. A lifting jack adapted to be applied to a relatively flat, substantially vertically disposed bar-like member secured to a vehicle to raise the same, the vehicle having a tendency to roll away from the jack when it is lifted thereby, comprising a thrust bar, a housing through which said bar is actuated, an attachment structure carried by said housing having a horizontally disposed ledge spaced from the axis of said bar upon which the lower edge of said member is adapted to be received and confined against lateral movement, means above said ledge spaced a greater distance from the axis of said bar than said ledge, and a shoulder extending from said ledge to said means, said means acting to clamp the member to said shoulder.

3. A lifting jack adapted to be applied to a relatively flat, substantially vertically disposed bar-like member secured to a vehicle to raise the same, the vehicle having a tendency to roll away from the jack when it is lifted thereby, comprising a supporting column, an attachment structure carried by said supporting column having a horizontally disposed ledge spaced from the axis of said thrust bar upon which the lower edge of said member is adapted to be received, said ledge having means at the opposite ends thereof confining the member against lateral movement, and means above said ledge spaced a greater distance from the axis of said supporting column than said ledge for engagement with the upper portion of said member for maintaining the same on said ledge.

4. A lifting jack adapted to be applied to a relatively flat, substantially vertically disposed bar-like member secured to a vehicle to raise the same, the vehicle having a tendency to roll away from the jack when it is lifted thereby, comprising a thrust bar, a housing through which said bar is actuated, an attachment structure carried by said housing having a horizontally disposed ledge spaced from the axis of said bar upon which the lower edge of said member is adapted to be received, said ledge having means at the opposite ends thereof confining the member against lateral movement, means above said ledge spaced a greater distance from the axis of said bar than said ledge, and a shoulder extending from said ledge to said means, said means acting to clamp the member to said shoulder.

5. A lifting jack adapted to be applied to a relatively flat, substantially vertically disposed bar-like member secured to a vehicle to raise the same, the vehicle having a tendency to roll away from the jack when it is lifted thereby, comprising a thrust bar, a housing through which said bar is actuated, an attachment structure carried by said housing having a horizontally disposed ledge spaced from the axis of said thrust bar, said ledge comprising a channel, upon which the lower edge of said member is adapted to be received and confined against lateral movement, and means above said ledge spaced a greater distance from the axis of said thrust bar than said ledge for engagement with the upper portion of said member for maintaining the same on said ledge.

6. A lifting jack adapted to be applied to a relatively flat, substantially vertically disposed bar-like member secured to a vehicle to raise the same, the vehicle having a tendency to roll away from the jack when it is lifted thereby, comprising a thrust bar, a housing through which said bar is actuated, an attachment structure carried by said housing having a horizontally disposed ledge spaced from the axis of said thrust bar, said ledge having spaced shoulder portions for engagement with opposite sides of said member, upon which the lower edge of said member is adapted to be received and confined against lateral movement, and means above said ledge spaced a greater distance from the axis of said thrust bar than said ledge for engagement with the upper portion of said member for maintaining the same on said ledge.

7. A lifting jack adapted to be applied to a relatively flat, substantially vertically disposed bar-like member secured to a vehicle to raise the same, the vehicle having a tendency to roll away from the jack when it is lifted thereby, comprising a thrust bar, a housing through which said bar is actuated, an attachment structure carried by said housing having a hook-shaped lower weight supporting portion upon which the lower edge of said member is adapted to be received and confined against lateral movement, and means above said lower portion spaced a greater distance from the axis of said thrust bar than said lower portion for engagement with the upper portion of said member for maintaining the same on said lower portion.

8. A lifting jack adapted to be applied to a relatively flat, substantially vertically disposed bar-like member secured to a vehicle to raise the same, the vehicle having a tendency to roll away from the jack when it is lifted thereby, comprising a housing, a thrust bar received within and actuated through said housing, an attachment structure carried by said housing, and means carried by said structure angularly disposed relatively to said thrust bar for receiving and rigidly clamping said member, whereby when said member is clamped by said means said thrust bar is disposed at an angle to said member.

9. A lifting jack adapted to be applied to a jack supporting portion secured to the sprung part of a vehicle to raise the same, the vehicle having a tendency to roll away from the jack when it is lifted thereby, comprising a housing, a thrust bar received within and actuated through said housing, and means supported by said housing disposed at an angle to the thrust bar for receiving said jack supporting portion, whereby when said jack supporting portion is received by said means said thrust bar is disposed at an angle to the horizontal.

10. A lifting jack adapted to be applied to a relatively flat, substantially vertically disposed bar-like member secured to a vehicle to raise the same, the vehicle having a tendency to roll away from the jack when it is lifted thereby, comprising a thrust bar, a housing through which said bar is actuated, an attachment structure carried by said housing having a seat for said member adjacent the axis of said thrust bar on which the lower edge of said member is received, and means carried by said jack materially laterally spaced from said thrust bar for rigidly clamping said member to said seat, whereby when said jack and member are clamped together said thrust bar is disposed at an angle to the horizontal.

11. A lifting jack adapted to be suspended from the sprung portion of a vehicle, comprising a housing, a downwardly actuated thrust bar received within and extending through said housing, means within said housing for actuating said thrust bar through said housing, and means disposed at an angle to said thrust bar for receiving and confining a portion of said vehicle, characterized by the fact that when a portion of said vehicle is confined by the seat, said thrust bar is disposed at an angle to the horizontal, and when said thrust bar is downwardly actuated to elevate said vehicle the tendency of the vehicle to roll away from the jack is restrained.

12. A lifting jack adapted to be applied to a relatively flat, substantially vertically disposed bar-like member secured to a vehicle to raise the same, the vehicle having a tendency to roll away from the jack when it is lifted thereby, comprising a thrust bar, a housing through which said bar is actuated, an attachment structure carried by said housing having a horizontally disposed ledge spaced from the axis of said bar upon which the lower edge of said member is adapted to be received and confined against lateral movement, means including a threadably received conical nose screw above said ledge spaced a greater distance from the axis of said bar than said ledge, and a shoulder extending from said ledge to said means, said conical nose screw acting to clamp said member to said shoulder.

13. A lifting jack adapted to be applied to a jack supporting portion secured to a sprung portion of a vehicle to raise the same, the vehicle having a tendency to roll away from the jack when it is lifted thereby, comprising a housing, a thrust bar received within and actuated through said housing, and means supported by said housing for receiving said jack supporting portion, said means being characterized by the fact that when said jack supporting portion is received thereby, said thrust bar is disposed at an angle to the horizontal, whereby the tendency of the vehicle to roll away from the jack when it is lifted thereby is restrained.

14. A lifting jack adapted to be applied to a jack supporting portion secured to a sprung portion of a vehicle to raise the same, the vehicle having a tendency to roll away from the jack when it is lifted thereby, comprising a thrust bar, actuating mechanism therefor mounted thereon, and an attachment portion supported by said actuating mechanism for receiving said jack supporting portion, said attachment portion being characterized by the fact that when said jack supporting portion is received therein said thrust bar is disposed at an angle to the horizontal, whereby the tendency of the vehicle to roll away from the jack when it is lifted thereby is restrained.

15. A lifting jack adapted to be applied to a jack supporting portion secured to a sprung portion of a vehicle to raise the same, the vehicle having a tendency to roll away from the jack when it is lifted thereby, comprising a thrust bar, a lifting member carried by said thrust bar and movable relatively axially to said thrust bar, means to move said lifting member along said thrust bar, said lifting member having means disposed at an angle to the thrust bar for receiving the vehicle jack supporting portion, said means being characterized by the fact that when a portion of the vehicle is received by said means, said thrust bar is disposed at an angle to the horizontal and when said lifting member is elevated the tendency of the vehicle to roll away from the jack is restrained.

16. A lifting jack adapted to be applied to a jack supporting portion secured to the sprung part of a vehicle to raise the same, the vehicle having a tendency to roll away from the jack when it is lifted thereby comprising a supporting column and a vehicle supporting member carried by said column, said vehicle supporting member being characterized by the fact that when said jack supporting portion is received by it, said supporting column is disposed at an angle to the horizontal, and when said vehicle supporting member is elevated the tendency of the vehicle to roll away from the jack is restrained.

17. A lifting jack adapted to be applied to a jack supporting portion secured to the sprung portion of a vehicle to raise the same, the vehicle having a tendency to roll away from the jack when it is lifted thereby, comprising a thrust bar, means supported for axial movement along said thrust bar for rigidly receiving the jack supporting portion, and means to move said receiving means along said thrust bar, said receiving means and vehicle portion being characterized by the fact that when said jack supporting portion is received by said receiving means said thrust bar is disposed at an angle to the horizontal and when said lifting member is elevated the tendency of the vehicle to roll away from the jack is restrained.

18. A lifting jack adapted to be applied to a jack supporting portion secured to the sprung portion of a vehicle to raise the same, the vehicle having a tendency to roll away from the jack when it is lifted thereby, comprising a supporting column, a base secured to said supporting column for pivotal movement relative thereto, a vehicle supporting member having means disposed at an angle to the supporting column for receiving the jack supporting portion, said member being characterized by the fact that when said jack supporting portion is received by said member said supporting column is disposed at an angle to the horizontal, and when said vehicle supporting member is elevated the tendency of the vehicle to roll away from the jack is restrained.

FREDERICK E. BEACH.